(12) United States Patent
Balraj (10) Patent No.: US 9,313,002 B1
(45) Date of Patent: Apr. 12, 2016

(54) METHOD FOR DETERMINING A CHANNEL ESTIMATE AND COMMUNICATION DEVICE

(71) Applicant: Intel Corporation, Santa Clara, CA (US)

(72) Inventor: Rajarajan Balraj, Nuremberg (DE)

(73) Assignee: INTEL CORPORATION, Santa Clara, CA (US)

( * ) Notice: Subject to any disclaimer, the term of this patent is extended or adjusted under 35 U.S.C. 154(b) by 12 days.

(21) Appl. No.: 14/495,908

(22) Filed: Sep. 25, 2014

(51) Int. Cl.
*H04B 17/00* (2015.01)
*H04L 5/00* (2006.01)
*H04W 72/08* (2009.01)
*H04W 24/08* (2009.01)

(52) U.S. Cl.
CPC ............. *H04L 5/0048* (2013.01); *H04W 24/08* (2013.01); *H04W 72/082* (2013.01)

(58) Field of Classification Search
CPC ...................................................... H04J 11/005
USPC .................. 455/63.1, 67.13, 296, 501, 562.1; 370/329
See application file for complete search history.

(56) References Cited

U.S. PATENT DOCUMENTS

2012/0224499 A1  9/2012  Yoo et al.
2013/0101060 A1  4/2013  Cendrillon et al.

OTHER PUBLICATIONS

Qualcomm Incorporated, "Enabling communication in harsh interference scenarios", 3GPP TSG-RAN WG1 #62, R1-104818, Aug. 23-Aug. 27, 2010, 11 pages.
"On CRS Interference Cancellation receiver in Rel 11 FeICIC", 3GPP TSG RAN WG4 Meeting #64-R4-124207, Aug. 13-17, 2012, 3 pages.
Extended European Search Report received for the counterpart European Patent Application Serial No. 15182085.9, mailed Feb. 1, 2016, 11 pages.

*Primary Examiner* — Hsin-Chun Liao

(57) ABSTRACT

A method for determining a channel estimate is described comprising receiving a first signal via a plurality of first communication resources and a second signal via a plurality of second communication resources, determining a first channel estimate for the plurality of first communication resources and a second channel estimate for the plurality of second communication resources, determining a combination of the channel estimates estimating a component of the combination that depends on the plurality of first communication resources removing the estimated component from the channel combination and determining a channel estimate for the plurality of second communication resources based on a remainder of the combination after removing the estimated component.

20 Claims, 8 Drawing Sheets

Colliding CRS Scenario:

METHOD FOR DETERMINING A CHANNEL ESTIMATE AND COMMUNICATION DEVICE

TECHNICAL FIELD

Embodiments described herein generally relate to methods for determining a channel estimate and communication devices.

BACKGROUND

For determining transmitted information from a signal received via a communication channel, it may be necessary to have information about the transmission characteristics of the communication channel. For this a receiver may perform channel estimation, e.g. based on received pilot signals. However, pilot signals may be subject to interferers. Accordingly, efficient approaches for channel estimation in an interference limited scenario are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
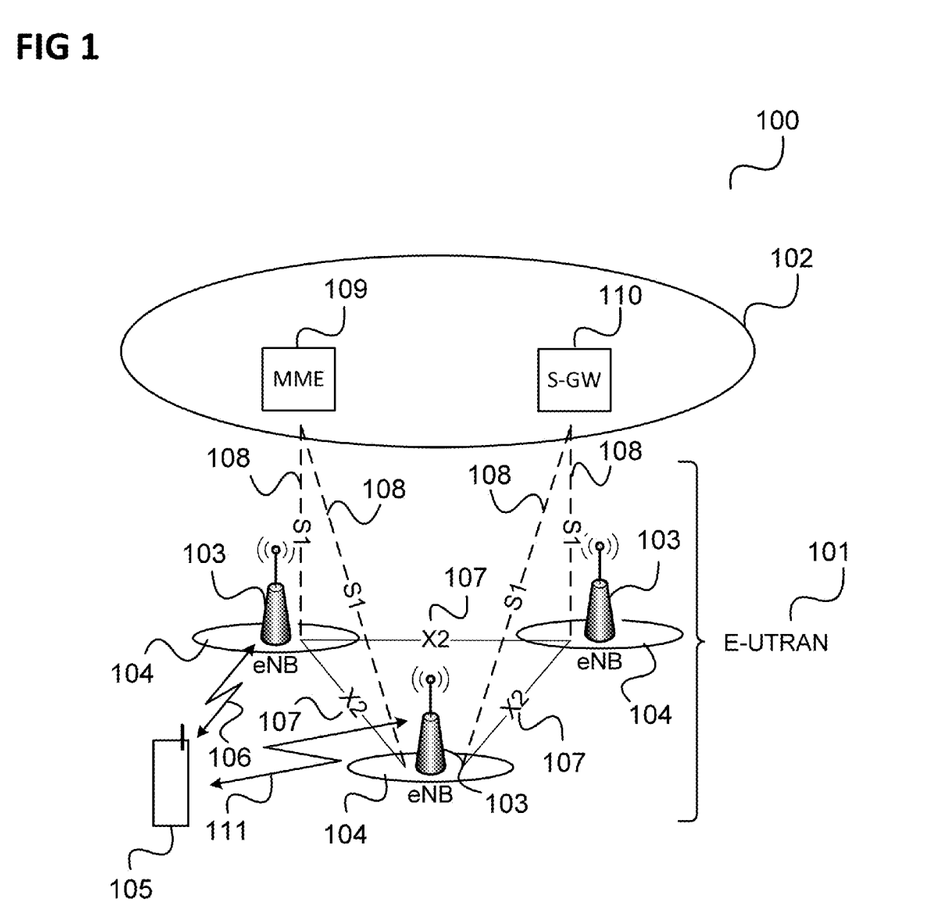
FIG. 1 shows a communication system according to a mobile communication standard, such as LTE.

FIG. 1 shows a communication system 100.

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution), or LTE-Advanced) 101 and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced). It should be noted that examples described in the following may also be applied to other communication networks than LTE communication networks, e.g. communication networks according to UMTS, GSM (Global System for Mobile Communications) etc.

A mobile terminal (e.g. UE) 105 located in a mobile radio cell 104 may communicate with the core network 102 and with other mobile terminals 105 via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data may be transmitted between a base station 103 and a mobile terminal 105 located in the mobile radio cell 104 operated by the base station 103 over the air interface 106 on the basis of a multiple access method. On the LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

In case of LTE, the radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

Each base station 103 of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

When the mobile terminal 105 communicates with base station 103 operating a radio cell 104, there may be interference from another base station 103 operating another radio cell 104 as illustrated by arrow 111. This interference is called inter cell interference. One of the key enhancements in LTE Rel-10 and Rel-11 can be seen in the adoption of enhanced inter cell interference coordination (eICIC). The main driver behind adoption of eICIC in LTE Rel-10/11 was to ensure reliable LTE operation in heterogeneous network deployments. Heterogeneous networks utilize a mix of diverse base stations deployed in order to improve the spectral efficiency per unit area. Such a layered network deployment can consist of regular placement of macro base stations (operating macro cells) that typically transmit at high power level (~5-40 W), overlaid with several Pico base stations (operating Pico-cells) that typically transmit at lower power levels (~100 mW-2 W). The lower powered Pico cells are deployed to eliminate the coverage holes in the macro cells and to improve efficiency in hot spots.

One of the key challenges in design of heterogeneous networks can be seen in the difference between low and high power base stations (e.g. Pico base stations and macro base stations) which can results in unfair distribution of data rates and uneven user experience among the user terminals in the network. For example, a Pico base station is characterized by substantially lower transmit power as compared to a macro base station. Due to the large disparity between the transmit power levels among these two types of base stations, the coverage of a Pico base station is significantly limited compared to that of a macro base station. The larger coverage of macro cells attracts more users towards high power macro base station although there might not be enough resources to efficiently serve all user terminals. At the same time, the resources of the smaller power Pico base station may remain underutilized.

In order to enable a Pico base station to operate in such a scenario, the concept of cell range expansion may be used. In this, the cell range of a Pico cell is expanded in order to allow more terminals to connect to the Pico base station. With cell range expansion, traffic is offloaded from the macro cell and a more balanced load distribution across the various nodes is achieved.

Macro cell transmission can be restricted from using the same time-frequency resources as the low-power Pico base station by resource partitioning. Resource partitioning can be in either in frequency domain by using carrier aggregation or in time domain by using almost blank sub frames (ABS).

In ABS the macro base station only transmits cell specific reference signals (CRS), such as Rel-9 CRS, synchronization signals and broadcast messages to enable full backward compatibility. However, the transmission of CRS may cause unwanted interference on the PHICH (Physical Hybrid-ARQ Indicator Channel), PCFICH (Physical Control Format Indicator Channel), PDCCH (Pysical Downlink Control Channel) and PDSCH (Physical Downlink Shared Channel) operated by the Pico base station in the midst of the "interference-free tunnel" formed by the ABS. The CRS interference in ABS can be differentiated in to two cases namely Non-colliding: CRS transmissions of the serving and interfering cell do not overlap Colliding: CRS transmissions of the serving and interfering cell overlap FIG. 2 illustrates interference to a serving cell by a non-colliding cell.

Figure 2:
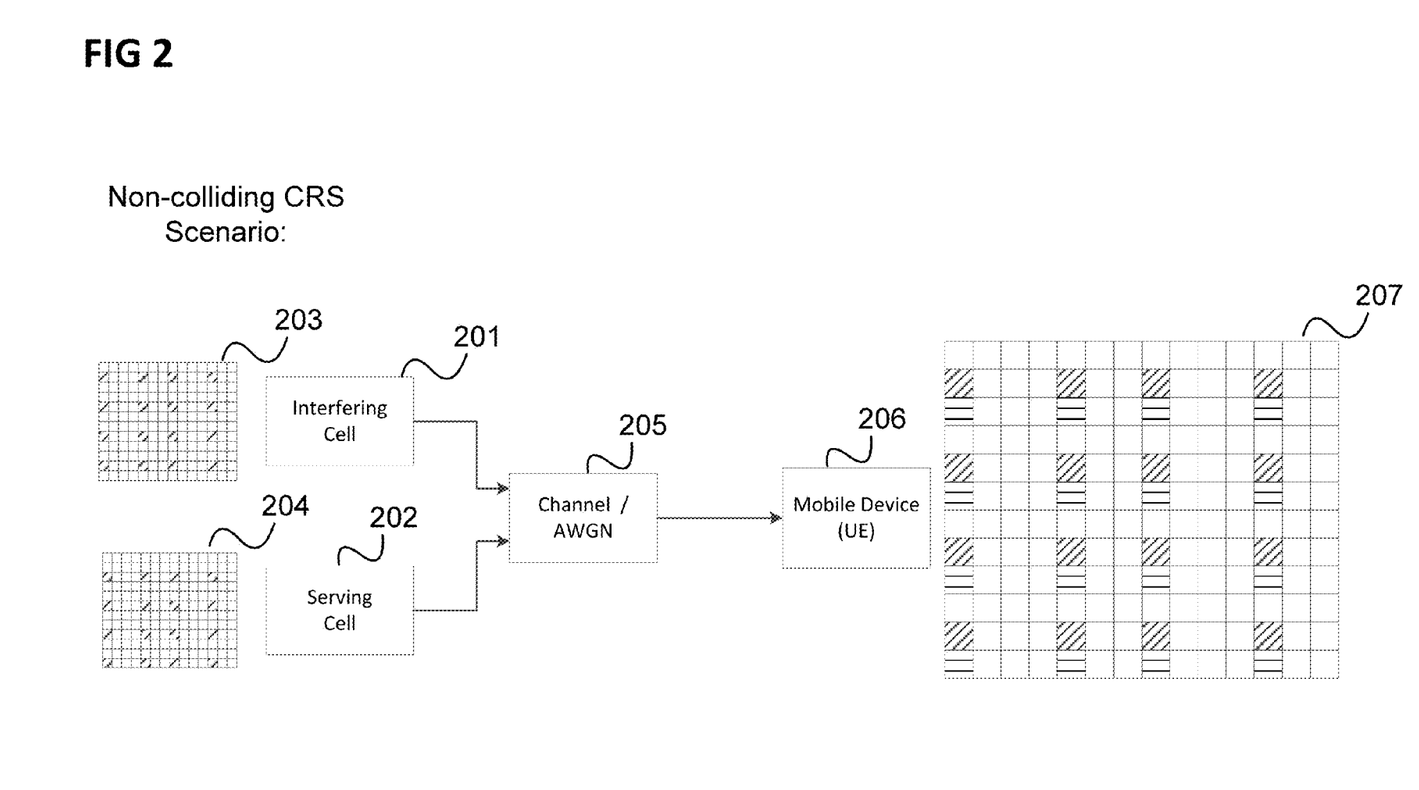
FIG. 2 illustrates interference by a non-colliding cell.

In the non-colliding scenario as illustrated in FIG. 2, an interfering cell 201 (i.e. the base station operating the interfering cell, e.g. a macro base station) transmits the CRS signals on different resource elements than the serving cell 202 (i.e. the Pico base station), as illustrated by a resource block 203 for the interfering cell 201 and a resource block 204 for the serving cell 202 in which the resource elements used for CRS transmission are shown with diagonal hatching.

This means that after transmission via a channel 205 (including addition of average white Gaussian noise) in the resource block 207 received by the UE 206 there are, in the OFDM symbols including the resource elements used for CRS transmission, resource elements, indicated by horizontal hatching, which are used for data transmission and which experience interference from the CRS signals of the interfering cell 201.

Figure 3:
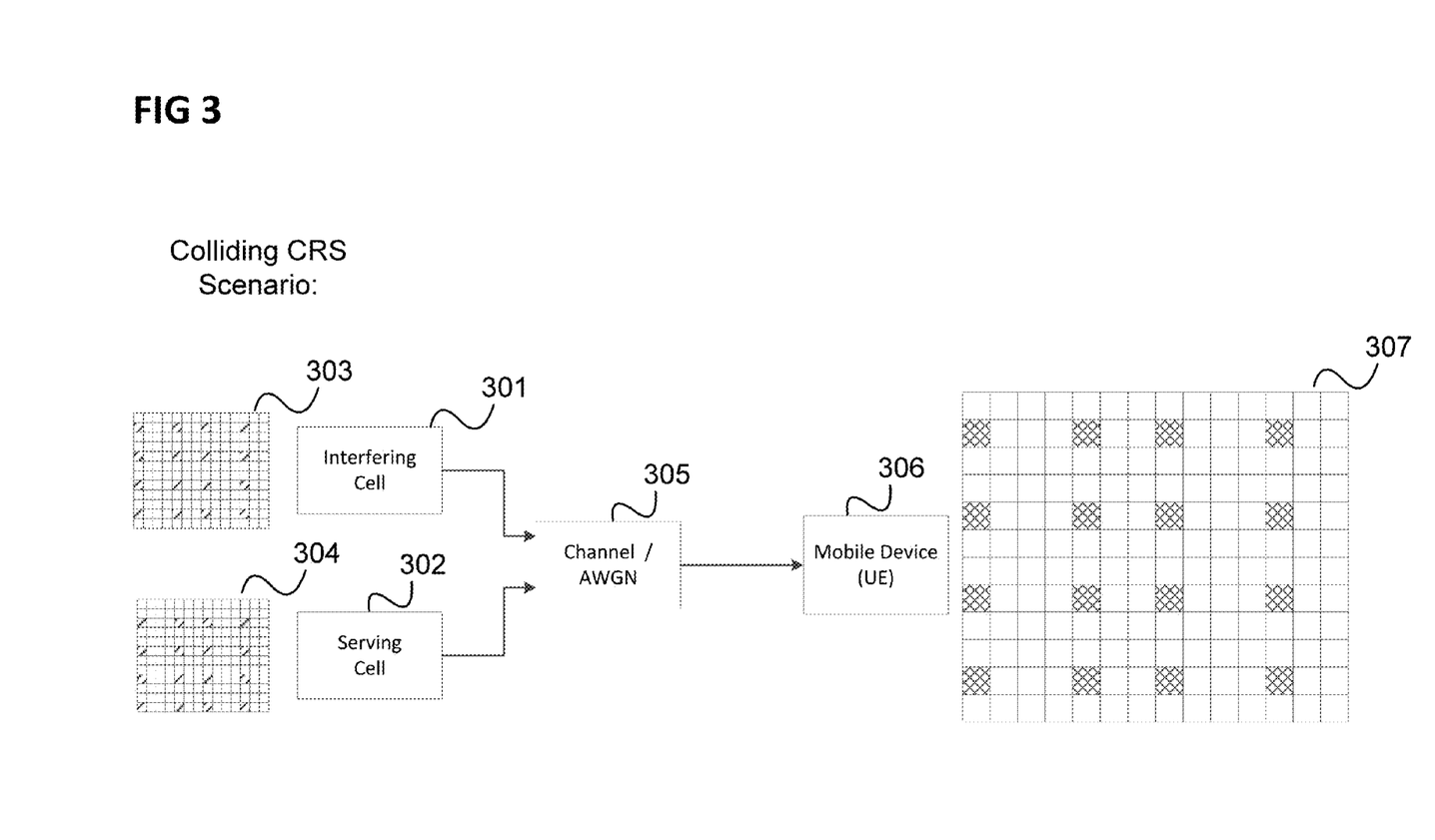
FIG. 3 illustrates interference by a colliding cell.

FIG. 3 illustrates interference to a serving cell by a colliding cell.

In the colliding scenario as illustrated in FIG. 3, an interfering cell 301 transmits the CRS signals on the same resource elements as the serving cell 302, as illustrated by a resource block 303 for the interfering cell 301 and a resource block 304 for the serving cell 302 in which the resource elements used for CRS transmission are shown with diagonal hatching. This means that after transmission via a channel 305 (including addition of average white Gaussian noise) in the resource block 307 received by the UE 306 the resource elements used for CRS transmission experience interference from the CRS signals of the interfering cell 301 (indicated by cross hatching).

In the colliding CRS scenario, conventional single-cell channel estimation can be employed for the serving cell by modeling interference as additional white Gaussian noise. However in case of a dominant colliding interferer, the channel estimation performance may degrade significantly with this approach.

Another approach is to employ to CRS-IC (CRS interference cancellation) for the colliding CRS case to improve channel estimation performance. A CRS canceling receiver is a receiver that cancels CRS signals received from one or more dominant interfering cells from the wanted signal of the serving cell. For this, knowledge of the CRS signals of the interfering cell(s) is assumed. Canceling CRS signals from the wanted signal requires channel estimation of the channel between the UE and the interfering cell. This approach is illustrated in FIG. 4.

Figure 4:
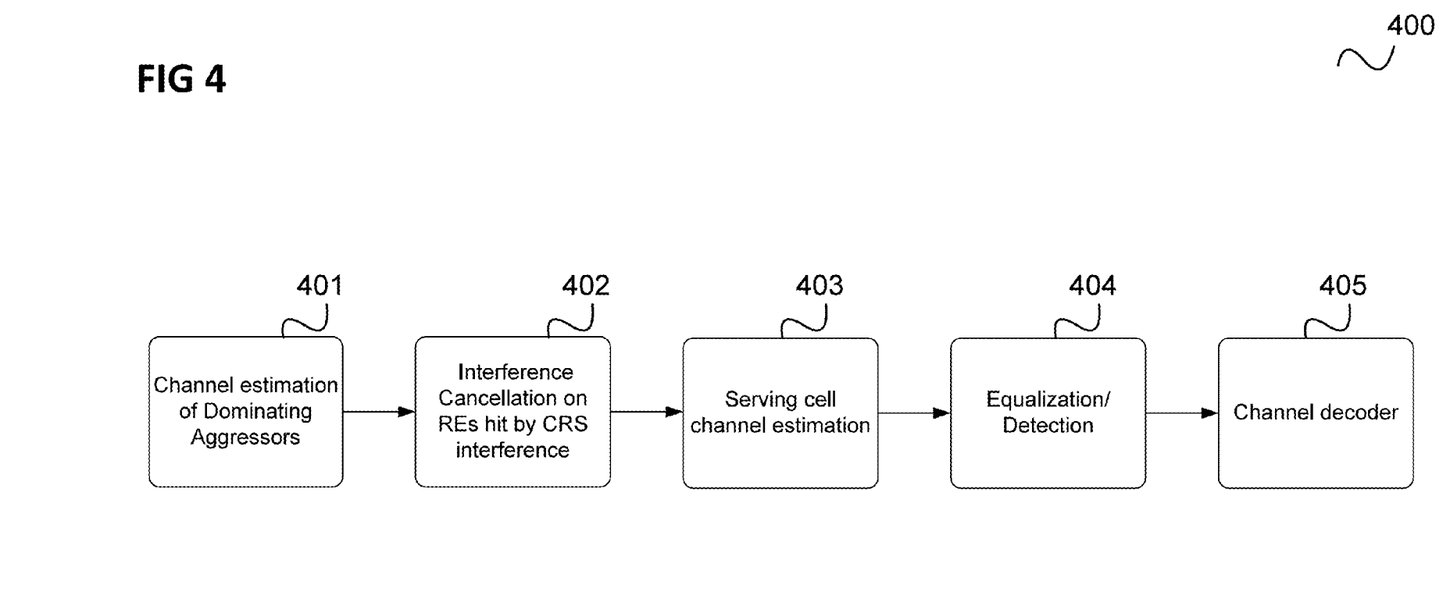
FIG. 4 shows a flow diagram illustrating a method carried out by a CRS canceling receiver, e.g. corresponding to mobile terminal.

FIG. 4 shows a flow diagram 400 illustrating a method carried out by a CRS canceling receiver, e.g. corresponding to mobile terminal 105.

In 401, the receiver performs a channel estimation of the one or more dominating aggressors (interferers).

In 402, the receiver cancels interference on the resource elements hit by CRS interference.

In 403, the receiver estimates the channel of its serving cell.

In 404, the receiver performs equalization and detection.

In 405, the receiver decodes the channel.

The approach illustrated in FIG. 4 typically has a high complexity since the receiver performs the channel estimation. Furthermore, the performance of CRS interference cancellation is sensitive to time offsets.

In the following, a channel estimating method is described that for example allows interference cancellation technique for the colliding CRS interference case.

Figure 5:
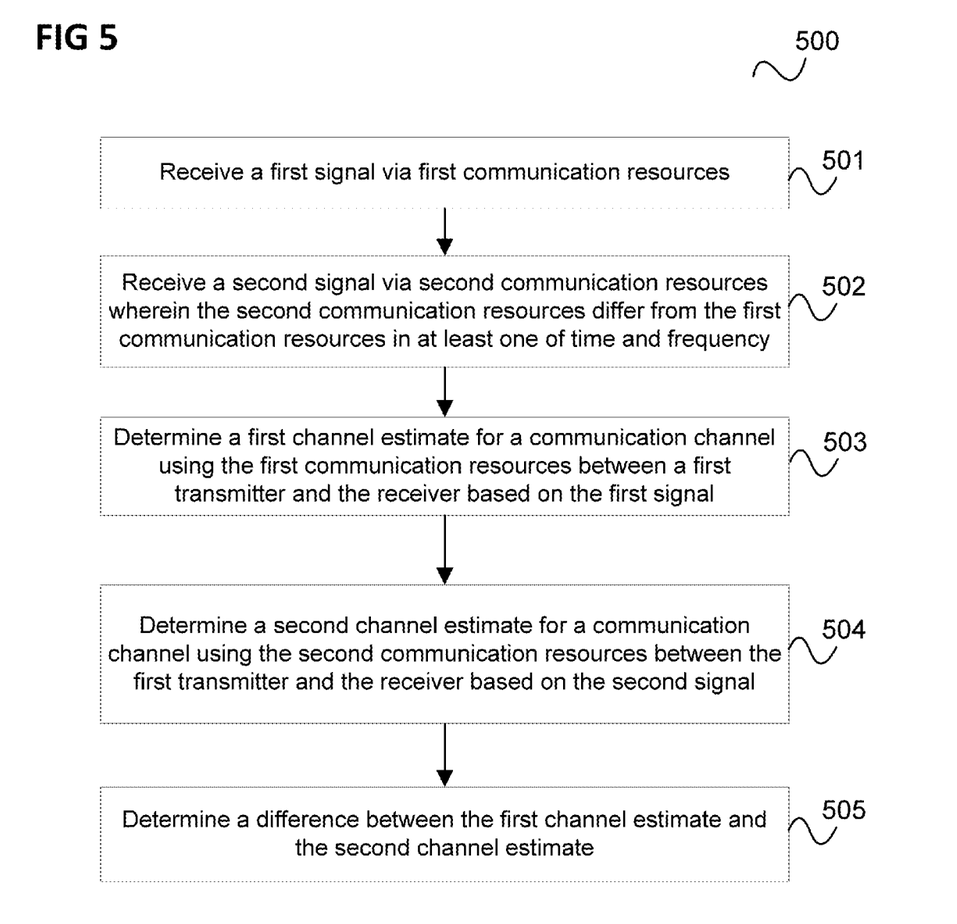
FIG. 5 shows a flow diagram illustrating a method for determining a channel estimate for a communication channel between a transmitter and a receiver, for example carried out by the receiver.

FIG. 5 shows a flow chart 500 illustrating a method for determining a channel estimate for a communication channel between a transmitter and a receiver, for example carried out by the receiver.

In 501, the receiver receives a first signal via a plurality of first communication resources.

In 502, the receiver receives a second signal via a plurality of second communication resources wherein the plurality of second communication resources differ from the plurality of first communication resources in at least one of time or frequency.

In 503, the receiver determines a first channel estimate for a communication channel based on the plurality of first communication resources between a first transmitter and the receiver based on the first signal.

In 504, the receiver determines a second channel estimate for a communication channel based on the plurality of second communication resources between the first transmitter and the receiver based on the second signal.

In 505, the receiver determines a combination of the first channel estimate and the second channel estimate.

In 506, the receiver estimates a component of the combination that depends on the communication channel based on the plurality of first communication resources between a second transmitter and the receiver.

In 507, the receiver removes the estimated component from the channel combination.

In 508, the receiver determines a channel estimate for a communication channel between the second transmitter and the receiver based on the plurality of second communication resources based on a remainder of the combination after removing the estimated component.

In other words, a channel estimate for the channel between the second transmitter (e.g. corresponding to a serving cell) and a receiver (e.g. a communication terminal) is determined based on a combination (e.g. a difference or a sum) of two channel estimates for channels between a first transmitter (e.g. corresponding to a colliding or interfering cell) and the receiver using different communication resources. The component of the combination that depends on the communication channel based on the plurality of first communication resources between a second transmitter and the receiver is eliminated such that a component that depends on the communication channel between the second transmitter and the receiver based on the plurality of second communication resources remains such that this communication channel can be estimated on the remainder.

The method illustrated in FIG. 5 allows channel estimation without channel estimation filtering of the interfering cell, estimation of large scale statistics for the interfering channel like delay spread, estimation of other parameters like SINR (signal to interference and noise ratio), time offset, etc., for the interfering channel and estimation of system parameters like number of CRS antenna ports and the MBSFN (Multicast Broadcast Single Frequency Network) sub-frame configuration. Additionally, the performance of the method is insensitive to time offsets between target and interfering cell.

Figure 6:
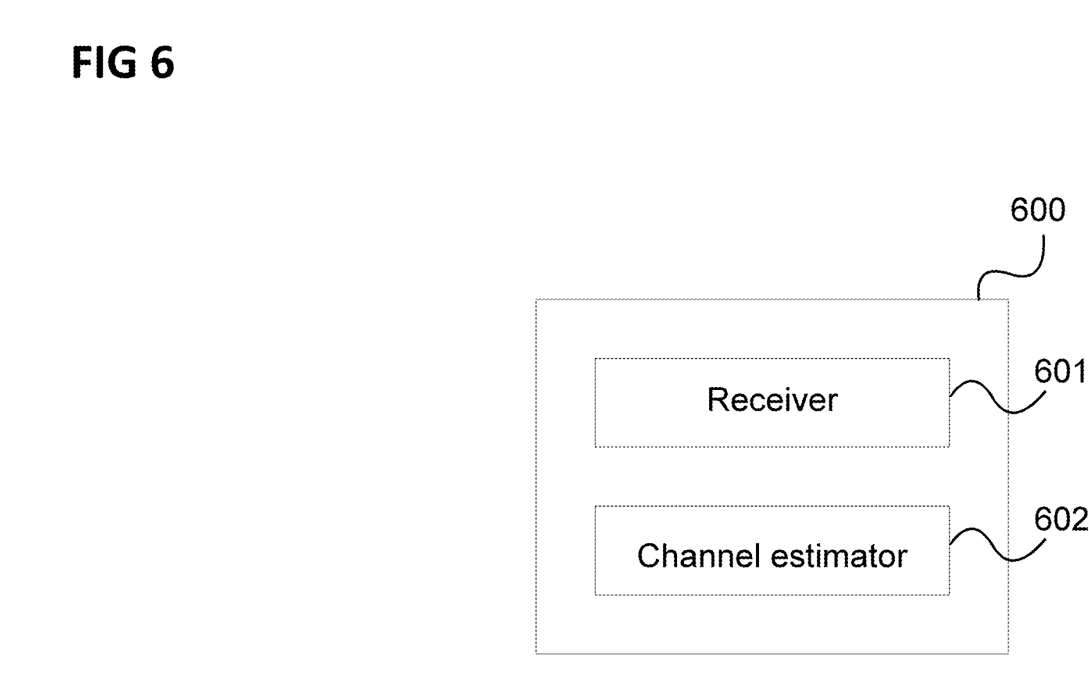
FIG. 6 shows a communication device applying the method illustrated in FIG. 5.

The method illustrated in FIG. 5 is for example carried out by a communication device as illustrated in FIG. 6.

FIG. 6 shows a communication device 600 applying the method illustrated in FIG. 5.

The communication device 600 comprises a receiver 601 configured to receive a first signal via a plurality of first communication resources and configured to receive a second signal via a plurality of second communication resources wherein the plurality of second communication resources differ from the plurality of first communication resources in at least one of time or frequency.

The communication device 600 further comprises a channel estimator 602 configured to determine a first channel estimate for a communication channel based on the plurality of first communication resources between a first transmitter and the receiver based on the first signal; determine a second channel estimate for a communication channel based on the plurality of second communication resources between the first transmitter and the receiver based on the second signal; determine a combination of the first channel estimate and the second channel estimate; estimate a component of the combination that depends on the communication channel based on the plurality of first communication resources between a second transmitter and the receiver; remove the estimated component from the channel combination; and determine a channel estimate for a communication channel between the second transmitter and the receiver based on the plurality of second communication resources based on a remainder of the combination after removing the estimated component.

The components of the communication device (e.g. the receiver and the channel estimator) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit". Accordingly, for example the channel estimator may correspond to a logic implemented by one or more circuits as described above.

The following examples pertain to further embodiments.

In Example 1 is a method for determining a channel estimate for a communication channel between a transmitter and a receiver as illustrated in FIG. 5.

In Example 2, the subject matter of Example 1 can optionally include the combination being a difference between the first channel estimate and the second channel estimate.

In Example 3, the subject matter of any one of Examples 1-2 can optionally include the combination being a combination of the first channel estimate and the second channel estimate to compensate interference components present in the first channel estimate and the second channel estimate.

In Example 4, the subject matter of any one of Examples 1-3 can optionally include the first transmitter being a transmitter interfering in a communication between the receiver and the second transmitter.

In Example 5, the subject matter of any one of Examples 1-4 can optionally include determining the first channel estimate including demodulating the first signal by a value transmitted by the first transmitter based on the plurality of first communication resources.

In Example 6, the subject matter of any one of Examples 1-5 can optionally include determining the second channel estimate including demodulating the second signal by a value transmitted by the first transmitter based on the plurality of second communication resources.

In Example 7, the subject matter of any one of Examples 1-6 can optionally include determining the channel estimate for the communication channel between the second transmitter and the receiver based on the plurality of second communication resources based on the remainder of the combination comprising demodulating the remainder of the combination by a value transmitted by the first transmitter based on the plurality of second communication resources and a value transmitted by the second transmitter based on the plurality of second communication resources.

In Example 8, the subject matter of any Example 7 can optionally include the value transmitted by the first transmitter based on the plurality of second communication resources and the value transmitted by the second transmitter based on the plurality of second communication resources each corresponding to a respective pilot sequence value.

In Example 9, the subject matter of any one of Examples 7-8 can optionally include demodulating the remainder comprising multiplying the remainder with the value transmitted by the first transmitter based on the plurality of second communication resources and the complex conjugate of the value transmitted by the second transmitter based on the plurality of second communication resources.

In Example 10, the subject matter of any one of Examples 1-9 can optionally include estimating the component of the combination that depends on the communication channel based on the plurality of first communication resources between the second transmitter and the receiver comprising determining a channel estimate for the communication channel based on the plurality of first communication resources between the second transmitter and the receiver and modulating the determined channel estimate with a value transmitted by the first transmitter based on the plurality of first communication resources and a value transmitted by the second transmitter based on the plurality of first communication resources.

In Example 11, the subject matter of Example 10 can optionally include the value transmitted by the first transmitter based on the plurality of first communication resources and the value transmitted by the second transmitter based on the plurality of first communication resources each corresponding to a respective pilot sequence value.

In Example 12, the subject matter of any one of Examples 10-11 can optionally include modulating the determined channel estimate comprising multiplying the determined channel estimate with the complex conjugate of the signal value transmitted by the first transmitter based on the plurality of first communication resources and the signal value transmitted by the second transmitter based on the plurality of first communication resources.

In Example 13, the subject matter of any one of Examples 1-12 can optionally include determining the channel estimate for the communication channel based on the plurality of first communication resources between the second transmitter and the receiver comprising filtering a plurality of channel estimates for communication channels between the second transmitter and the receiver.

In Example 14, the subject matter of Example 13 can optionally include the plurality of channel estimates comprising one or more channel estimates for one or more communication channels based on other communication resources than the plurality of first communication resources and the plurality of second communication resources.

In Example 15, the subject matter of Example 14 can optionally include the other communication resources differing from the plurality of first communication resources and the plurality of second communication resources in at least one of frequency and time.

In Example 16, the subject matter of any one of Examples 1-15 can optionally include the communication channels being pilot channels.

Example 17 is a computer readable medium having recorded instructions thereon which, when executed by a processor, make the processor perform a method for performing radio communication according to any one of Examples 1 to 16.

Example 18 is a communication device is illustrated in FIG. 6.

In Example 19, the subject matter of Examples 18 can optionally include the combination being a difference between the first channel estimate and the second channel estimate.

In Example 20, the subject matter of any one of Examples 18-19 can optionally include the combination being a combination of the first channel estimate and the second channel estimate to compensate interference components present in the first channel estimate and the second channel estimate.

In Example 21, the subject matter of any one of Examples 18-20 can optionally include the first transmitter being a transmitter interfering in a communication between the receiver and the second transmitter.

In Example 22, the subject matter of any one of Examples 18-21 can optionally include the channel estimator being configured to determine the first channel estimate by demodulating the first signal by a value transmitted by the first transmitter based on the plurality of first communication resources.

In Example 23, the subject matter of any one of Examples 18-22 can optionally include the channel estimator being configured to determine the second channel estimate by demodulating the second signal by a value transmitted by the first transmitter based on the plurality of second communication resources.

In Example 24, the subject matter of any one of Examples 18-23 can optionally include the channel estimator being configured to determine the channel estimate for the communication channel between the second transmitter and the receiver based on the plurality of second communication resources based on the remainder of the combination by demodulating the remainder of the combination by a value transmitted by the first transmitter based on the plurality of second communication resources and a value transmitted by the second transmitter based on the plurality of second communication resources.

In Example 25, the subject matter of Example 24 can optionally include the value transmitted by the first transmitter based on the plurality of second communication resources and the value transmitted by the second transmitter based on the plurality of second communication resources each corresponding to a respective pilot sequence value.

In Example 26, the subject matter of any one of Examples 24-25 can optionally include demodulating the remainder comprising multiplying the remainder with the value transmitted by the first transmitter based on the plurality of second communication resources and the complex conjugate of the value transmitted by the second transmitter based on the plurality of second communication resources.

In Example 27, the subject matter of any one of Examples 18-26 can optionally include the channel estimator being configured to estimate the component of the combination that depends on the communication channel based on the plurality of first communication resources between the second transmitter and the receiver by determining a channel estimate for the communication channel based on the plurality of first communication resources between the second transmitter and the receiver and modulating the determined channel estimate with a value transmitted by the first transmitter based on the plurality of first communication resources and a value transmitted by the second transmitter based on the plurality of first communication resources.

In Example 28, the subject matter of Example 27 can optionally include the value transmitted by the first transmitter based on the plurality of first communication resources and the value transmitted by the second transmitter based on the plurality of first communication resources each corresponding to a respective pilot sequence value.

In Example 29, the subject matter of any one of Examples 27-28 can optionally include modulating the determined channel estimate comprising multiplying the determined channel estimate with the complex conjugate of the signal value transmitted by the first transmitter based on the plurality of first communication resources and the signal value transmitted by the second transmitter based on the plurality of first communication resources.

In Example 30, the subject matter of any one of Examples 18-29 can optionally include the channel estimator being configured to determine the channel estimate for the communication channel based on the plurality of first communication resources between the second transmitter and the receiver by filtering a plurality of channel estimates for communication channels between the second transmitter and the receiver.

In Example 31, the subject matter of Example 30 can optionally include the plurality of channel estimates comprising one or more channel estimates for one or more communication channels based on other communication resources than the plurality of first communication resources and the plurality of second communication resources.

In Example 32, the subject matter of Example 31 can optionally include the other communication resources differing from the plurality of first communication resources and the plurality of second communication resources in at least one of frequency and time.

In Example 33, the subject matter of any one of Examples 18-32 can optionally include the communication channels being pilot channels.

Example 34 is a communication device comprising a receiving means for receiving a first signal via a plurality of first communication resources and for receiving a second signal via a plurality of second communication resources wherein the plurality of second communication resources differ from the plurality of first communication resources in at least one of time or frequency and a channel estimating means for determining a first channel estimate for a communication channel based on the plurality of first communication resources between a first transmitter and the receiving means based on the first signal; determining a second channel estimate for a communication channel based on the plurality of second communication resources between the first transmitter and the receiving means based on the second signal; determining a combination of the first channel estimate and the second channel estimate; estimating a component of the combination that depends on the communication channel based on the plurality of first communication resources between a second transmitter and the receiving means; removing the estimated component from the channel combination; and determining a channel estimate for a communication channel between the second transmitter and the receiving means based on the plurality of second communication resources based on the remainder of the combination after removing the estimated component.

In Example 35, the subject matter of Example 34 can optionally include the combination being a difference between the first channel estimate and the second channel estimate.

In Example 36, the subject matter of any one of Examples 34-35 can optionally include the combination being a combination of the first channel estimate and the second channel estimate to compensate interference components present in the first channel estimate and the second channel estimate.

In Example 37, the subject matter of any one of Examples 34-36 can optionally include the first transmitter being a transmitter interfering in a communication between the receiving means and the second transmitter.

In Example 38, the subject matter of any one of Examples 34-37 can optionally include the channel estimating means being for determining the first channel estimate by demodulating the first signal by a value transmitted by the first transmitter based on the plurality of first communication resources.

In Example 39, the subject matter of any one of Examples 34-38 can optionally include the channel estimating means being for determining the second channel estimate by demodulating the second signal by a value transmitted by the first transmitter based on the plurality of second communication resources.

In Example 40, the subject matter of any one of Examples 34-39 can optionally include the channel estimating means being for determining the channel estimate for the communication channel between the second transmitter and the receiving means based on the plurality of second communication resources based on the remainder of the combination by demodulating the remainder of the combination by a value transmitted by the first transmitter based on the plurality of second communication resources and a value transmitted by the second transmitter based on the plurality of second communication resources.

In Example 41, the subject matter of Example 40 can optionally include the value transmitted by the first transmitter based on the plurality of second communication resources and the value transmitted by the second transmitter based on the plurality of second communication resources each corresponding to a respective pilot sequence value.

In Example 42, the subject matter of any one of Examples 40-41 can optionally include demodulating the remainder comprising multiplying the remainder with the value transmitted by the first transmitter based on the plurality of second communication resources and the complex conjugate of the value transmitted by the second transmitter based on the plurality of second communication resources.

In Example 43, the subject matter of any one of Examples 34-42 can optionally include the channel estimating means being for estimating the component of the combination that depends on the communication channel based on the plurality of first communication resources between the second transmitter and the receiving means by determining a channel estimate for the communication channel based on the plurality of first communication resources between the second transmitter and the receiving means and modulating the determined channel estimate with a value transmitted by the first transmitter based on the plurality of first communication resources and a value transmitted by the second transmitter based on the plurality of first communication resources.

In Example 44, the subject matter of Example 43 can optionally include the value transmitted by the first transmitter based on the plurality of first communication resources and the value transmitted by the second transmitter based on the plurality of first communication resources each corresponding to a respective pilot sequence value.

In Example 45, the subject matter of any one of Examples 43-44 can optionally include modulating the determined channel estimate comprising multiplying the determined channel estimate with the complex conjugate of the signal value transmitted by the first transmitter based on the plurality of first communication resources and the signal value transmitted by the second transmitter based on the plurality of first communication resources.

In Example 46, the subject matter of any one of Examples 34-45 can optionally include the channel estimating means being for determining the channel estimate for the communication channel based on the plurality of first communication resources between the second transmitter and the receiving means by filtering a plurality of channel estimates for communication channels between the second transmitter and the receiving means.

In Example 47, the subject matter of Example 46 can optionally include the plurality of channel estimates comprising one or more channel estimates for one or more communication channels based on other communication resources than the plurality of first communication resources and the plurality of second communication resources.

In Example 48, the subject matter of Example 47 can optionally include the other communication resources differing from the plurality of first communication resources and the plurality of second communication resources in at least one of frequency and time.

In Example 49, the subject matter of any one of Examples 34-48 can optionally include the communication channels being pilot channels.

It should be noted that one or more of the features of any of the examples above may be combined with any one of the other examples.

In the following, examples are described in more detail. Specifically, a colliding CRS Interference Cancellation algorithm is explained in detail for a one CRS antenna port scenario as an example. The algorithm can be easily extended to 2 or 4 CRS antenna ports.

Figure 7:
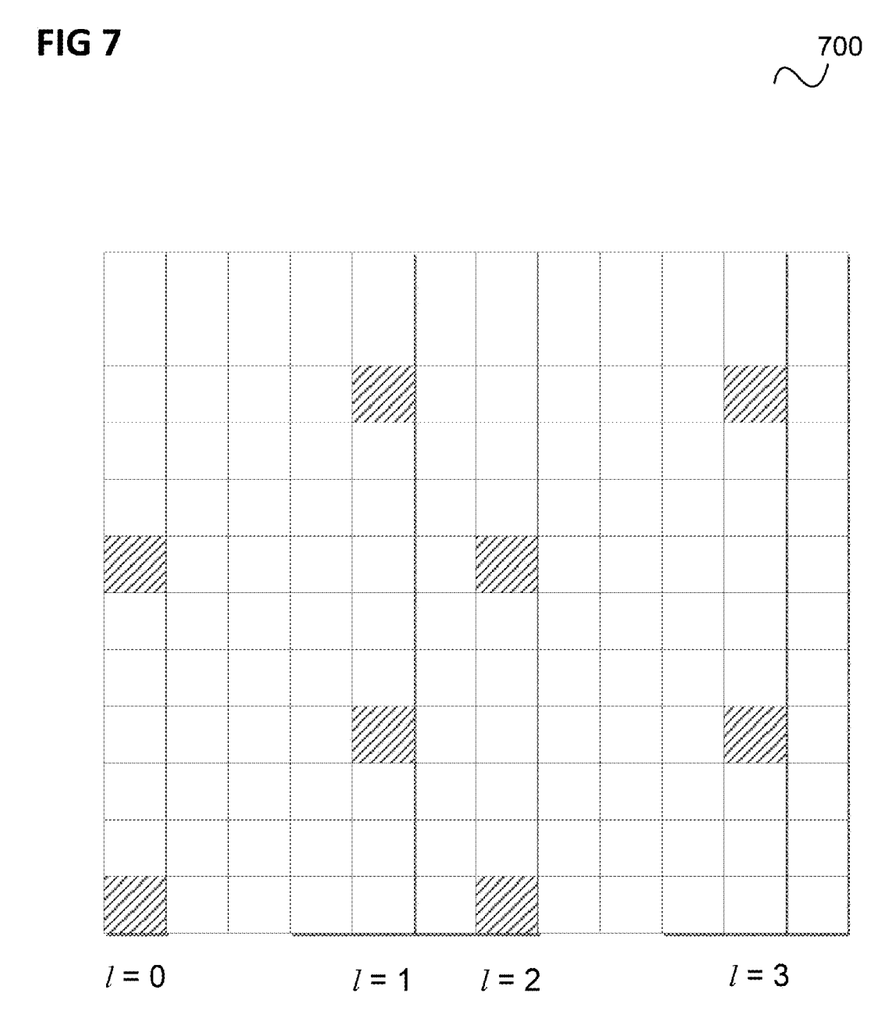
FIG. 7 shows a resource block illustrating a resource element allocation for cell-specific reference symbols for one antenna port.

FIG. 7 shows a resource block 700 illustrating a resource element allocation for cell-specific reference symbols for one antenna port.

It is assumed that the resource allocation illustrated in FIG. 7 is the resource allocation of a serving cell of a mobile terminal (also referred to as target cell) and an interfering cell in a colliding CRS scenario. In the following, the index S is used for values related to the serving cell and index I is used for values related to the interfering cell.

In the resource blocks 700, the hatched resource elements are used for CRS transmission. The OFDM symbols used for CRS transmission are identified using the index l with l=0, . . . 3 in the example of FIG. 7.

Let y(l) and y(l+v) be the CRS REs (resource elements) in OFDM symbols l and l+v received by the mobile terminal. The subcarrier indices are omitted for the sake of clarity and v≠0.

Equations 1 and 2 depict the received CRS REs of the target cell in the presence of a colliding interferer.

$$y(l)=h_S x_S(l)+h_I(l)x_I(l)+n(l) \quad (1)$$

$$y(l+v)=h_S(l+v)x_S(l+v)+h_I(l+v)x_I(l+v)+n(l+v) \quad (2)$$

where, $h_S$ and $h_I$ are the channel coefficients for the target and colliding cell respectively, $x_S$ and $x_I$ are the pilot sequence symbols for the target and colliding cell respectively, and n denotes additive white Gaussian noise with variance $\sigma_n^2$.

Figure 8:
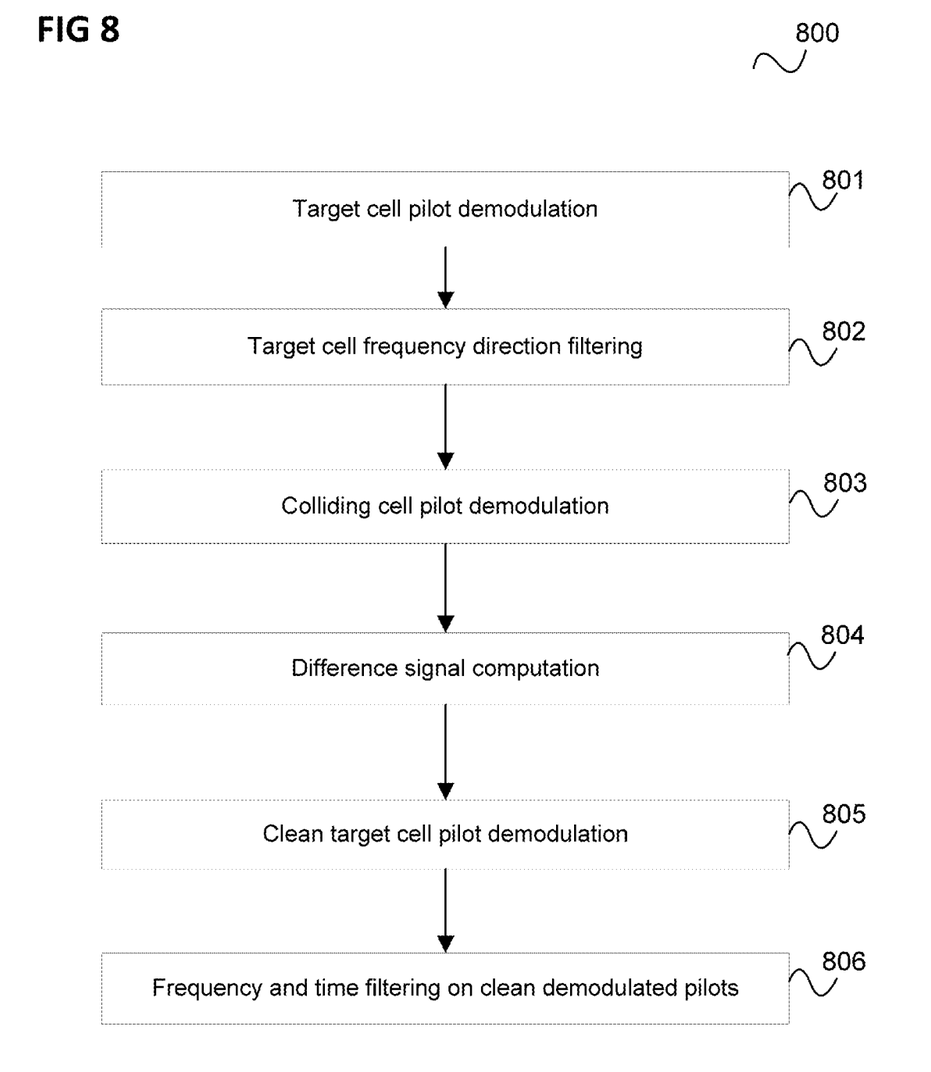
FIG. 8 shows a flow chart illustrating the CRS Interference Cancellation algorithm which the mobile terminal uses according to the present example.

FIG. 8 shows a flow diagram 800 illustrating the CRS Interference Cancellation algorithm which the mobile terminal uses according to the present example.

The interference cancellation is described for a pair of CRS OFDM symbols l and l+v. The described algorithm is applicable to remaining OFDM symbol pairs in a sub-frame.

In 801, the mobile terminal performs target cell pilot demodulation.

The mobile terminal computes demodulated pilots (i.e. the channel coefficients) for the target cell on all CRS OFDM symbols in a sub-frame. Equations 3 and 4 depict the demodulated pilots on neighboring CRS-OFDM symbols l and l+v.

$$\bar{h}_S(l)=y(l)x_S(l)h_S(l)+h_I(l)x_I(l)x_S(l)+n(l)x_S(l)$$

$$\bar{h}_S(l+v)=y(l+v)x_S^*(l+v) \quad (3)$$

$$=h_S(l+v)+h_I(l+v)x_I(l+v)x_S^*(l+v)+n(l+v)x_S^*(l+v) \quad (4)$$

where $\bar{h}_S$ is the demodulated pilot (i.e. the channel coefficient of the pilot channel) of the target cell.

The term "demodulation" can be seen in the context of determining a channel estimate to mean "taking the known modulation of the pilot channel into account".

In 802, the mobile terminal performs target cell frequency direction filtering is done on the demodulated pilots computed in step 801. Equations (5) and (6) depict the frequency direction filtering on neighboring CRS-OFDM symbols l and l+v.

$$\bar{h}_f(l,k)=\Sigma_i f_i \bar{h}_S(l,k-i) \quad (5)$$

$$\bar{h}_f(l+v,k)=\Sigma_i f_i \bar{h}_S(l+v,k-i) \quad (6)$$

where k is the subcarrier index $f_i$ is the frequency filter coefficient. The filtering is for example on a small number of neighboring (in frequency domain) subcarriers, wherein the (k−i)-th subcarrier has an estimated channel coefficient of $\bar{h}_S(l,k-i)$ for the l-th OFDM symbol and $\bar{h}_S(l+v,k-i)$ for the (l+v)-th OFDM symbol. As an example for symbol l and subcarrier 6, a 5 tap frequency filtering can be depicted as, $\bar{h}_f(l,6)=f_4\bar{h}_S(l,4)+f_5\bar{h}_S(l,5)+f_6\bar{h}_S(l,6)+f_7\bar{h}_S(l,7)+f_8\bar{h}_S(l,8)$.

In 803, the mobile terminal performs colliding cell pilot demodulation. The mobile terminal computes demodulated pilots for the colliding cell on all the CRS OFDM symbols in a sub-frame. Equations 7 and 8 depict the demodulated pilots on neighboring CRS-OFDM symbols l and l+v.

$$\bar{h}_I(l)=y(l)x_I^*(l)=h_I(l)+h_S(l)x_S(l)x_I^*(l)+n(l)x_I^*(l)$$

$$\bar{h}_I(l+v)=y(l+v)x_I^* \quad (7)$$

$$=h_I(l+v)+h_S(l+v)x_S(l+v)x_I^*(l+v)+n(l+v)x_I^*(l+v) \quad (8)$$

where $\bar{h}_I$ is the demodulated pilot of the colliding cell.

In 804, the mobile terminal computes a difference signal $Z_S$ on the colliding cell demodulated pilots as shown in Equation 9.

$$z_S=\bar{h}_I(l)-\bar{h}_I(l+v)$$

$$=h_I(l)-h_I(l+v)+h_S(l)x_S(l)x_I^*(l)-h_S(l+v)x_S(l+v)x_I^*(l+v)+n(l)x_I^*(l)-n(l+v)x_I^*(l+v)$$

$$=h_I(l)-h_I(l+v)+h_S(l)x_S(l)x_I^*(l)-h_S(l+v)x_S(l+v)x_I^*(l+v)+n_z \quad (9)$$

In channels with low and medium Doppler spread the channel is relatively constant across two neighboring OFDM symbols and hence $h_I(l) \approx h_I(l+v)$. Taking this in to account Equation 9 can be approximated as follows $$z_S \approx h_I(l) - h_I(l) + h_S(l)x_S(l)x_I^*(l) - h_S(l+v)x_S(l+v)x_I^*(l+v) + n_z$$

$$\approx h_S(l)x_S(l)x_I^*(l) - h_S(l+v)x_S(l+v)x_I^*(l+v) + n_z \quad (10)$$

One can observe in Equation 10 that the contribution due to colliding interferer is absent and only contributions of the target cell channel along with cross products of the target and colliding pilot sequence are present.

In 805, the mobile terminal performs a clean target cell pilot demodulation. For this, the mobile terminal computes interference cancelled demodulated pilots of the target cell for OFDM symbols l and l+v. The extraction of demodulated pilots from $z_S$ is given by Equations 11 and 12.

$$\tilde{h}_S(l) = (z_S + \Sigma_t w_t \bar{h}_{f,t}(l+v)x_S(l+v)x_I^*(l+v))x_I(l)x_S^*(l) \quad (11)$$

$$\tilde{h}_S(l+v) = -(z_S - \Sigma_t w_t \bar{h}_{f,t}(l)x_S(l)x_I^*(l))x_I(l+v)x_S^*(l+v) \quad (12)$$

As an example, according to Equation (11), to extract the demodulated pilots for symbol l the mobile terminal
  removes $h_S(l+v)x_S(l+v)x_I^*(l+v)$ consisting of the target cell channel and pilot cross product from symbol l+v.
  performs cross demodulation using the sequence $x_I(l)x_S^*(l)$
wherein the mobile terminal estimates the channel coefficient $h_S(l+v)$ by performing time direction filtering on the frequency filtered pilots $\bar{h}_f$ as represented by the weighted sums in Equations (11) and (12). The time direction filtering may include frequency filtered pilots from current, previous and also future sub-frames. For example, the weighted sums in Equations (11) and (12) may run over $-3 \leq t \leq 0$ with t=0 being the current sub-frame or also $-3 \leq t \leq 3$ for taking future sub-frames into account. The time filter coefficients can be designed using the Wiener criterion by taking Doppler, SNR, etc.

It should be noted that when performing time direction filtering across sub-frames, frequency filtered channel estimates from previous sub-frames computed on the clean demodulated pilots may be used. In this case there are two groups of frequency filtered channel estimates with different interference levels with variance $$\frac{\sigma_{n_Z}^2}{\gamma}$$

and $$\frac{\sigma_{n_Z}^2 + \sigma_{h_I}^2}{\gamma}.$$

is the filter gain of the frequency filter according to Equations (5) and (6). Filter gain $\gamma$ can be computed as $$\frac{1}{\sum_i \|f_i\|^2}.$$

The performance of the algorithm can be improved by taking in to account the different interference levels while designing the time direction filters.

In 806, the mobile terminal performs frequency and time filtering on the clean demodulated pilots.

The mobile terminal performs frequency direction and time direction filtering on the clean demodulated pilots of the target cell computed in 805.

The algorithm illustrated in FIG. 8 can for example be seen as an example of the method illustrated in FIG. 5 with the following correspondence:
First transmitter: interfering station I
Second transmitter: serving Station S
First resources: CRS resource element of time slot l+v Second resources: CRS resource element of time slot l
First signal: y(l+v)
Second signal: y(l)
First channel estimate: $h_f(l+v)$
Second channel estimate: $h_f(l)$
Combination of the first channel estimate with the second channel estimate: $z_S$
Component of the combination that depends on the communication channel based on the plurality of first communication resources between a second transmitter and the receiver: $h_S(l+v)x_S(l+v)x_I(l+v)$ In this example, the communication resources are time slots. However, the communication resources may also be subcarriers. In other words, the combination ($z_S$ in above example) may also be computed for channel estimates for different subcarriers. These may correspond to different time slots but do not have to. For example, the channel estimates are determined for signal values received in the two resource elements of the 0th OFDM symbol in FIG. 7.

Simulations of the algorithm illustrated in FIG. 8 show that
  The algorithm outperforms receivers with no CRS interference cancellation by a margin >12 dB when SIR=−6 dB
  The algorithm outperforms receivers with no CRS interference cancellation by a considerable margin when SIR=+6 dB
  Interference cancellation such as for example illustrated in FIG. 4 is very sensitive to time offsets. In some scenarios, the performance of the algorithm illustrated in FIG. 8 may be worse than that of a receiver without interference cancellation.
  The algorithm outperforms both receivers (no cancellation and CRS-IC) in all scenarios by non-negligible margins.
  The performance of the algorithm is very close to interference free case.
  The algorithm is insensitive to time offsets of the interfering cell.
  The simulations were performed with different combinations of the following parameters:
  Signal-to-Interference Ratio→−6 and +6 dB
  Time offset of interferer with respect target cell→2.5 and 5 micro-seconds
  Frequency filter with a design width of 80 Ts were used for the target cell
  Robust frequency filters with design width of 144 Ts were used for the colliding interferer (Applicable only to conventional interference cancellation)

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A method for determining a channel estimate for a communication channel between a transmitter and a receiver comprising:
a receiver receiving a first signal via a plurality of first communication resources;
the receiver receiving a second signal via a plurality of second communication resources wherein the plurality of second communication resources differ from the plurality of first communication resources in at least one of time or frequency;
determining a first channel estimate for a communication channel based on the plurality of first communication resources between a first transmitter and the receiver based on the first signal;
determining a second channel estimate for a communication channel based on the plurality of second communication resources between the first transmitter and the receiver based on the second signal;
determining a combination of the first channel estimate and the second channel estimate;
estimating a component of the combination that depends on the communication channel based on the plurality of first communication resources between a second transmitter and the receiver;
removing the estimated component from the channel combination; and
determining a channel estimate for a communication channel between the second transmitter and the receiver based on the plurality of second communication resources based on a remainder of the combination after removing the estimated component.

2. Method according to claim 1, wherein the combination is a difference between the first channel estimate and the second channel estimate.

3. Method according to claim 1, wherein the combination is a combination of the first channel estimate and the second channel estimate to compensate interference components present in the first channel estimate and the second channel estimate.

4. Method according to claim 1, wherein the first transmitter is a transmitter interfering in a communication between the receiver and the second transmitter.

5. Method according to claim 1, wherein determining the first channel estimate includes demodulating the first signal by a value transmitted by the first transmitter based on the plurality of first communication resources.

6. Method according to claim 1, wherein determining the second channel estimate includes demodulating the second signal by a value transmitted by the first transmitter based on the plurality of second communication resources.

7. Method according to claim 1, wherein determining the channel estimate for the communication channel between the second transmitter and the receiver based on the plurality of second communication resources based on the remainder of the combination comprises demodulating the remainder of the combination by a value transmitted by the first transmitter based on the plurality of second communication resources and a value transmitted by the second transmitter based on the plurality of second communication resources.

8. Method according to claim 7, wherein the value transmitted by the first transmitter based on the plurality of second communication resources and the value transmitted by the second transmitter based on the plurality of second communication resources each correspond to a respective pilot sequence value.

9. Method according to claim 7, wherein demodulating the remainder comprises multiplying the remainder with the value transmitted by the first transmitter based on the plurality of second communication resources and the complex conjugate of the value transmitted by the second transmitter based on the plurality of second communication resources.

10. Method according to claim 1, wherein estimating the component of the combination that depends on the communication channel based on the plurality of first communication resources between the second transmitter and the receiver comprises determining a channel estimate for the communication channel based on the plurality of first communication resources between the second transmitter and the receiver and modulating the determined channel estimate with a value transmitted by the first transmitter based on the plurality of first communication resources and a value transmitted by the second transmitter based on the plurality of first communication resources.

11. Method according to claim 10, wherein the value transmitted by the first transmitter based on the plurality of first communication resources and the value transmitted by the second transmitter based on the plurality of first communication resources each correspond to a respective pilot sequence value.

12. Method according to claim 10, wherein modulating the determined channel estimate comprises multiplying the determined channel estimate with the complex conjugate of the signal value transmitted by the first transmitter based on the plurality of first communication resources and the signal value transmitted by the second transmitter based on the plurality of first communication resources.

13. Method according to claim 1, wherein determining the channel estimate for the communication channel based on the plurality of first communication resources between the second transmitter and the receiver comprises filtering a plurality of channel estimates for communication channels between the second transmitter and the receiver.

14. Method according to claim 13, wherein the plurality of channel estimates comprise one or more channel estimates for one or more communication channels based on other communication resources than the plurality of first communication resources and the plurality of second communication resources.

15. Method according to claim 14, wherein the other communication resources differ from the plurality of first communication resources and the plurality of second communication resources in at least one of frequency and time.

16. Method according to claim 1, wherein the communication channels are pilot channels.

17. A non-transitory computer readable medium having recorded instructions thereon which, when executed by a processor, make the processor perform a method for performing radio communication according to claim 1.

18. A communication device comprising:
a receiver configured to receive a first signal via a plurality of first communication resources and configured to receive a second signal via a plurality of second communication resources wherein the plurality of second communication resources differ from the plurality of first communication resources in at least one of time or frequency;

a channel estimator configured to
- determine a first channel estimate for a communication channel based on the plurality of first communication resources between a first transmitter and the receiver based on the first signal;
- determine a second channel estimate for a communication channel based on the plurality of second communication resources between the first transmitter and the receiver based on the second signal;
- determine a combination of the first channel estimate and the second channel estimate;
- estimate a component of the combination that depends on the communication channel based on the plurality of first communication resources between a second transmitter and the receiver;
- remove the estimated component from the channel combination; and
- determine a channel estimate for a communication channel between the second transmitter and the receiver based on the plurality of second communication resources based on a remainder of the combination after removing the estimated component.

19. Communication device according to claim 18, wherein the combination is a difference between the first channel estimate and the second channel estimate.

20. Communication device according to claim 18, wherein the combination is a combination of the first channel estimate and the second channel estimate to compensate interference components present in the first channel estimate and the second channel estimate.

* * * * *